C. M. MANLY.
VEHICLE TIRE.
APPLICATION FILED JUNE 29, 1914.

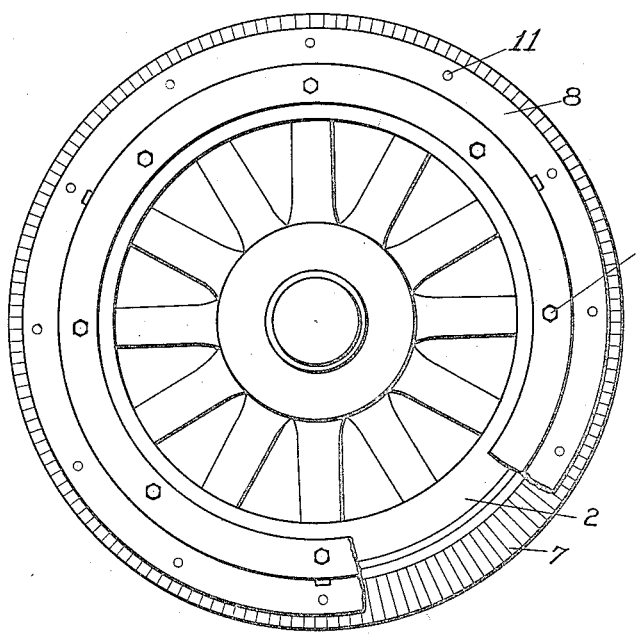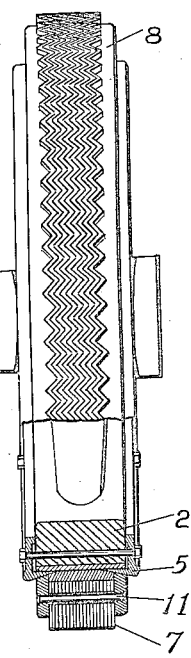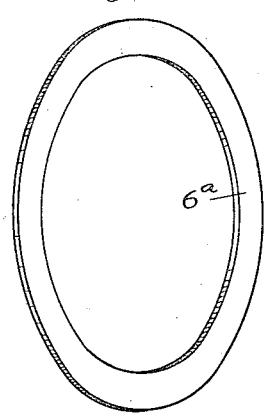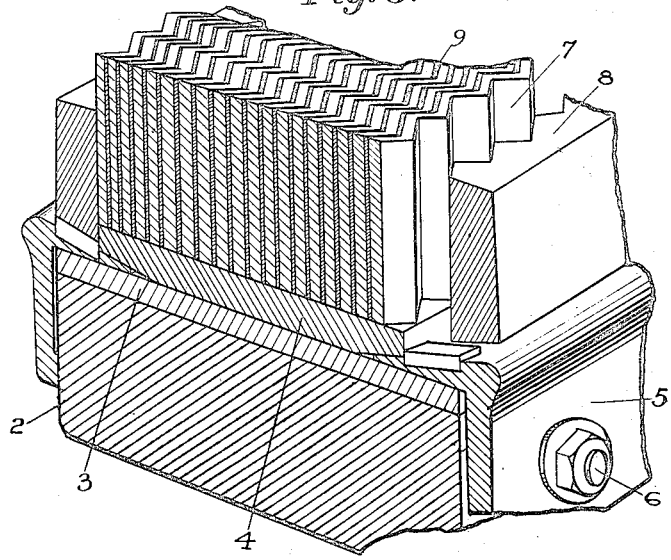

1,223,816.

Patented Apr. 24, 1917.
3 SHEETS—SHEET 2.

WITNESSES:
Rupert E. Rundell.
A. J. Miller

INVENTOR
Charles M. Manly
BY ATTORNEY
W. B. Morton

C. M. MANLY.
VEHICLE TIRE.
APPLICATION FILED JUNE 29, 1914.

1,223,816.

Patented Apr. 24, 1917.
3 SHEETS—SHEET 3.

WITNESSES:
Rupert E. Randell.
A. J. Miller

INVENTOR
Charles M. Manly
BY ATTORNEY
W. B. Morton

UNITED STATES PATENT OFFICE.

CHARLES M. MANLY, OF FREEPORT, NEW YORK.

VEHICLE-TIRE.

1,223,816.      Specification of Letters Patent.      Patented Apr. 24, 1917.

Application filed June 29, 1914. Serial No. 847,970.

*To all whom it may concern:*

Be it known that I, CHARLES M. MANLY, a citizen of the United States, and resident of Freeport, county of Queens, and State of New York, have invented certain new and useful Improvements in Vehicle-Tires, of which the following is a specification.

This invention relates to vehicle tires, and particularly tires intended for heavy road vehicles, such as motor trucks, traction engines, etc.

An object of the invention is to provide a tire of this character which will provide ample tractive grip for driving on road pavements of all kinds, and which will effectively prevent lateral slipping or skidding on slippery pavements.

A further object of the invention is to provide a tire of this character which possesses considerable resiliency as compared with a metal wheel or wooden wheel not equipped with rubber tires, and which is of a simple construction and cheap manufacturing cost.

A further object of the invention is to provide a tire having means for clamping it to a wheel in such manner that the tire may be circumferentially drawn in against the wheel rim as the wheel shrinks or the tire expands in use.

Further objects of my invention appear in the construction hereinafter described and illustrated in the accompanying drawings, it being understood that the details of construction therein shown and described represent the preferred embodiments of the invention, but that the invention is not limited to such details except except in so far as is recited in the appended claims.

In the said drawings Figure 1 is a side view of one modification of my improved vehicle tire applied to a truck wheel;

Fig. 2 is an end view, partly in section of the wheel shown in Fig. 1;

Fig. 3 is an enlarged perspective view of a portion of the wheel rim and the tire shown in Fig. 1.

Figure 4:
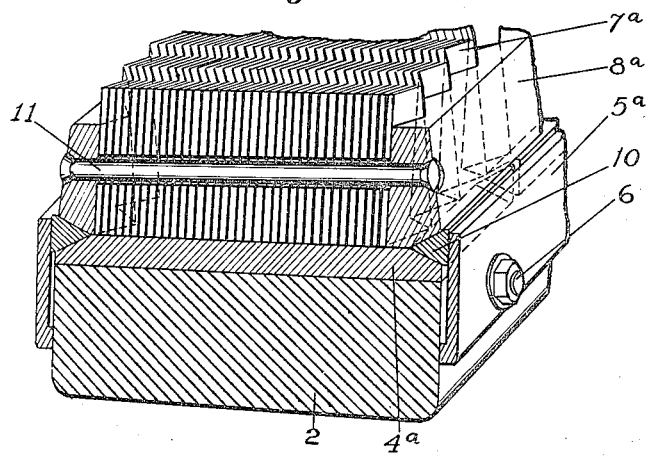
Figs. 4 and 5 are similar views of different modifications of the wheel rim and tire.

Figs. 6 to 12 inclusive are detailed views which will be later described.

Referring to the drawings and particularly to Figs. 1, 2 and 3, 1 represents a wheel, which may be of any suitable construction and having the usual rim or felly 2, here shown as faced with the metal ring 3. Surrounding this ring is a second metal ring 4 which is cut away on its inner face at each edge to form wedge shaped slots for the reception of the tapered flanges of the clamping rings 5, which are bolted on each side of the rim 2 by bolts 6 passing through the rim as shown.

Surrounding the ring 4 is the tire proper made up of a series of corrugated sheet metal rings 7 having their edges forming the bearing surface of the tire. The rings 7 are preferably formed with sharp angled instead of round corrugations so that they will fit compactly together when drawn together by the clamping plates 8 on either side. The plates 8 are provided on their inner vertical faces with corrugations to fit the faces of the adjacent rings, and on their inner peripheries are tapered to rest on the upper tapered surface of the flanges of the clamping rings 5. The rings 7 which are preferably of a resilient sheet steel are separated from each other by alternating rings of some softer or more compressible material, such for instance as pressed fiber, fabric or rubber, or if desired the spacing rings 9 may be of soft metal.

At intervals around the circumference of the wheel, keys 10 are inserted in slots between the plates 8 and the flanges of the rings 5 to hold the tire against "creeping" on the wheel rim.

Figure 7:
Figure 12:
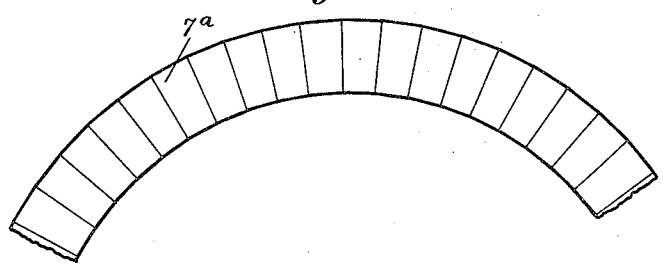

There are three different ways in which the corrugated rings 7 may be manufactured. In the modification shown in Figs. 1, 2 and 3, the rings have the corrugations at their circumference of the same depth as at the inner edge. This shape of ring is produced by shaping a plain metal ring 7ᶜ such as shown in Fig. 6 by drawing dies which will draw the metal at the inner circumference which is necessary to produce the corrugations of the same depth as at the outer circumference. A ring 7 of this form is shown in Fig. 7.

Figure 9:
Figure 11:
Figure 10:
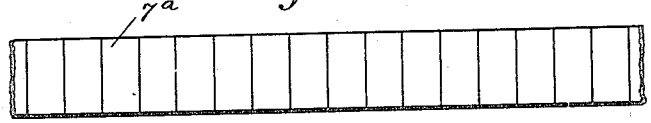

A second way of constructing the rings is to corrugate a flat strip of metal by simple rollers or otherwise, and then bending the metal edgewise into the form of a ring. In Figs. 10 and 11 I have shown a strip of this character before it is bent, and in Figs. 9 and 12 I have shown a ring after it is curved to fit the wheel rim. In a ring of this kind the corrugations are obviously deeper on their inner edges than on the outer edges as indicated in Fig. 9 wherein the ring is marked 7ª.

Figure 8:

The third way to produce the rings is to corrugate the ring shown in Fig. 6 by ordinary stamping dies which do not draw the metal. When the ring is produced in this manner the corrugations at the outer circumference of the ring are of greater depth than at the inner circumference. A ring of this kind is shown in Fig. 8 and marked 7ᵇ.

In Fig. 4 I have shown a section or tire composed of the second type rings. As here shown the rim 2 is faced with a metal plate 4ª which is surrounded by the rings 7ª which may or may not have intermediate spacing rings as desired. The edges of the ring 4ª are beveled off on their outer face to receive splitwedge shaped clamping rings 10, whose opposite faces work against similarly beveled edges on the inner faces of the side clamping plates 8ª.

The lateral faces of the rings 10 are engaged by the upper edges of the clamping rings 5ª which are drawn together by bolts 6 as in the previously described construction. The ring 7ª and clamping plates 8ª are preferably held together for convenient removal as a unit by means of cross bolts or rivets 11 passing through the ring and plates.

Figure 5:
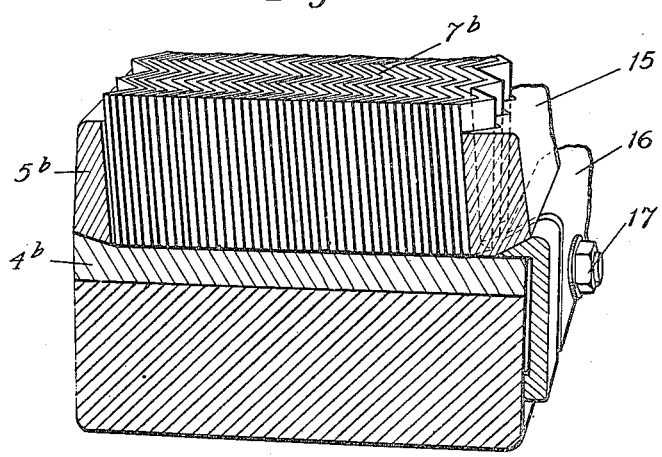

In Fig. 5 I have shown tires made up of rings of the third class. As here shown the metal rim 4ᵇ is provided on one edge with an inclined flange for receiving the clamping plate 5ᵇ which is shaped to fit. The rings 7ᵇ are assembled on the rim 4ᵇ against the plate 5ᵇ and are held by an opposite clamping plate 15 which engages the opposite side of the rings. The lower outer edge of the plate 15 is beveled to receive the wedge shaped flange of the split clamping ring 16 supported on bolts 17 projecting from the side of the wheel rim.

Any form of clamping device which has been described may be used with any form of rings, and as will be obvious the wedging action produced by drawing up the clamping bolts, not only draws the clamping plates laterally against the tire rings, but also takes up any radial looseness of the clamping plates. In the construction shown in Fig. 5 means are provided to also take up any radial looseness of the tire rings. This is accomplished by having the corrugated faces of the clamping plates cut with deeper corrugations than the corresponding faces of the tire rings so that the plates engage the rings only in the depressions of the corrugations. By this construction, as the clamping plates are drawn together the corrugations will be deepened thereby reducing the diameter of the ring and drawing them down against the rim 4ᵇ. This feature is particularly applicable to the style of ring shown in this figure for the reason that the engaging faces of the tire rings and clamping plates are inclined to draw the rings inward by their wedging action.

Having thus described my invention, what I claim and desire to secure by Letters Patent is:—

1. A vehicle tire having its tread formed of a plurality of corrugated rings of sheet material clamped together with projections on the face of each ring set in the recesses on the face of the adjacent rings, the edges of said rings forming the load supporting and wearing surface of the tire.

2. A vehicle tire having its tread formed of a plurality of alternate rings of corrugated sheet metal and softer material clamped together with the edges of the sheet metal forming the load-supporting and wearing surface of the tire, the softer material being of a thickness less than the depth of the corrugations.

3. A vehicle tire having its tread composed of a plurality of rings of sheet material with the edges of the rings forming the wearing surface of the tire, and means for clamping said rings together and decreasing the diameter of the rings to draw them into close contact with the periphery of the wheel.

4. A vehicle tire having its tread composed of a plurality of corrugated rings of sheet material having the corrugations angular and extending diagonally of the circumference of the wheel, and means for clamping said rings together to form a compact body with the edges of the rings forming the driving surface of the tire comprising clamping plates on each side of the rings, said clamping plates engaging only the depressions of the corrugations whereby when they are drawn together the diameter of the rings will be reduced.

5. In a vehicle tire the combination of a rim, a plurality of rings of sheet material surrounding said rim with their edges forming the wearing surface of the tire, clamping rings engaging the opposite side faces of said sheet metal rings, and means for drawing said clamping rings together to clamp said sheet metal rings and simultaneously radially clamping said supporting rim.

6. In a vehicle tire the combination of a rim, a plurality of rings of sheet material surrounding said rim with their edges forming the wearing surface of the tire, clamping rings engaging the opposite side faces of said sheet metal rings, and wedge-shaped locking rings engaging the inner peripheries of the clamping rings, said locking rings being provided with means for drawing the rings together to thereby clamp the sheet metal rings and simultaneously lock the clamping rings against radial movement.

Signed at New York in the county of New York and State of New York this 13th day of June, 1914.

CHARLES M. MANLY.

Witnesses:
A. I. MILLER,
RUPERT E. RUNDELL.